Jan. 29, 1963 T. M. ELFVING ET AL 3,075,360

THERMOELECTRIC HEAT PUMP ASSEMBLY

Filed Feb. 6, 1961 3 Sheets-Sheet 1

INVENTORS
THORE M. ELFVING
RICHARD D. BAKER

BY Flehr and Swain
ATTORNEYS

INVENTORS
THORE M. ELFVING
RICHARD D. BAKER
BY
ATTORNEYS

INVENTORS.
THORE M. ELFVING
RICHARD D BAKER
BY
Flehr and Swain
ATTORNEYS

United States Patent Office 3,075,360
Patented Jan. 29, 1963

3,075,360

THERMOELECTRIC HEAT PUMP ASSEMBLY

Thore M. Elfving, San Mateo, and Richard D. Baker, Redwood City, Calif.; said Baker assignor to said Elfving Filed Feb. 6, 1961, Ser. No. 87,360
10 Claims. (Cl. 62—3)

The present invention relates generally to a thermoelectric heat pump assembly and more particularly to an improved mounting of the thermocouple assemblies of the heat pump.

It is an object of the present invention to provide an improved and convenient method for thermally connecting the thermocouple assemblies of a heat pump to metal surfaces while at the same time insulating the thermocouple junctions electrically from the metal bodies to which they are attached.

It is another object of the invention to provide a mounting which eliminates or reduces internal heat losses between metal members attached to thermocouple assemblies in thermoelectric heat pump assembly, minimizes temperature drops and safeguards the thermocouples from being overheated because of inferior thermal contacts for the dissipation of heat at one or more hot junctions.

It is another object of the present invention to provide improved gluing methods in connection with thermocouple assemblies.

It is a further object to provide protective structures for use in the build up of thermoelectric heat pump assemblies.

Additional objects and features of my invention will appear from the following description in which the invention is described with reference to the accompanying drawings.

Referring to the drawings.

Figure 3:
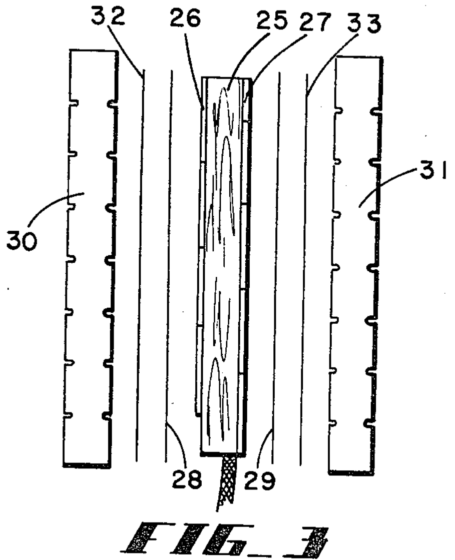
FIGURE 3 shows a schematic side view of a module and two protective plates with the different coatings and films by which the module and the plates are bonded together to a thermoelectric plate unit according to the invention.
Figure 3A:
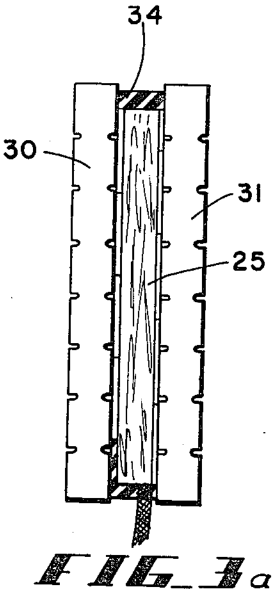

FIGURE 3*a* shows the same thermoelectric plate unit after being assembled.

Figure 4:
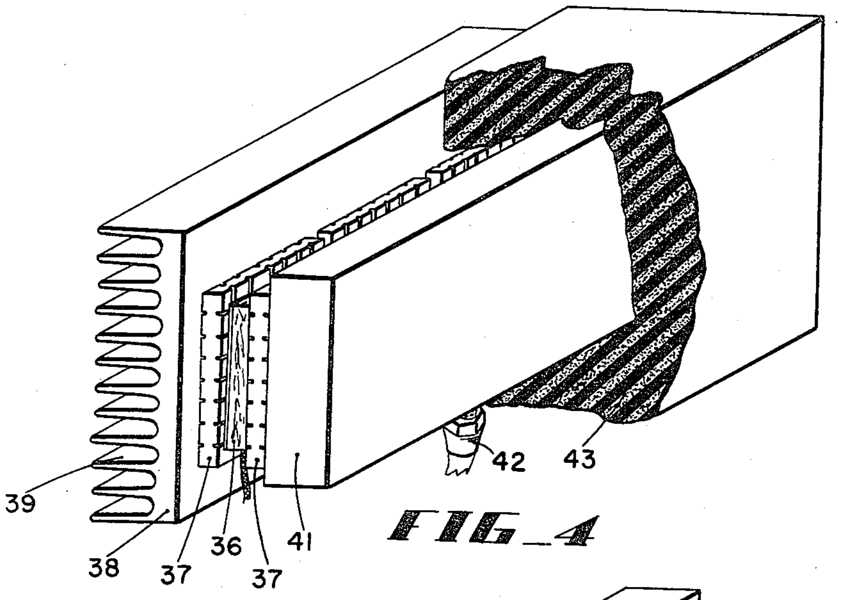
Figure 5:
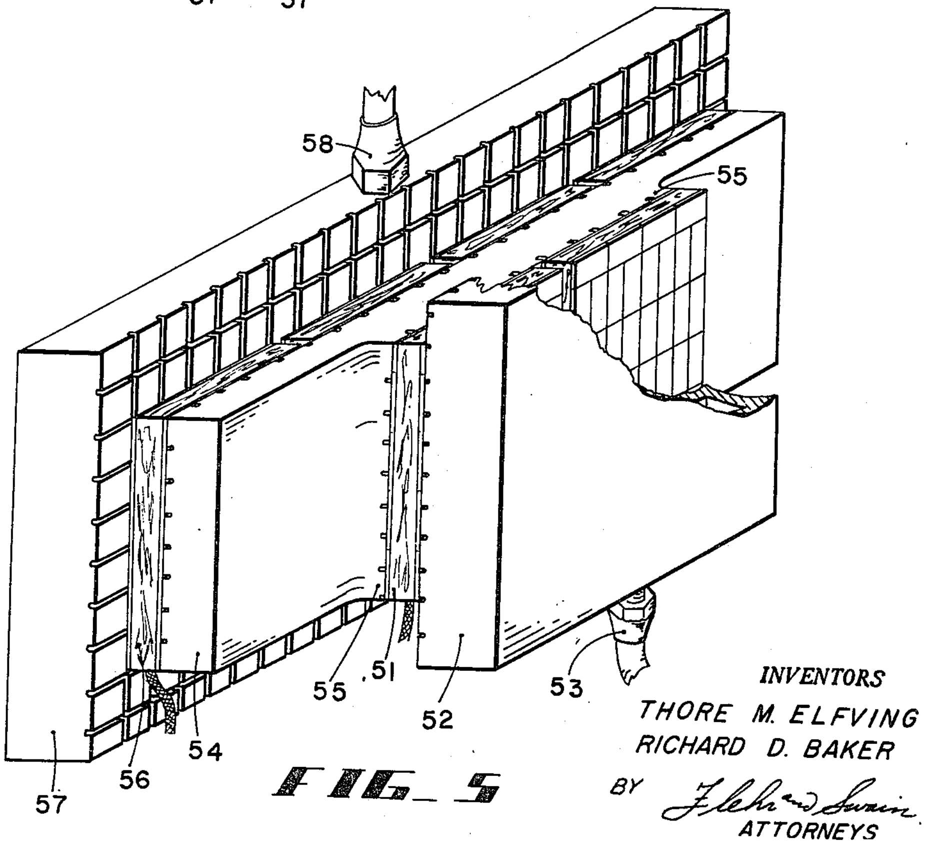
Figure 6:
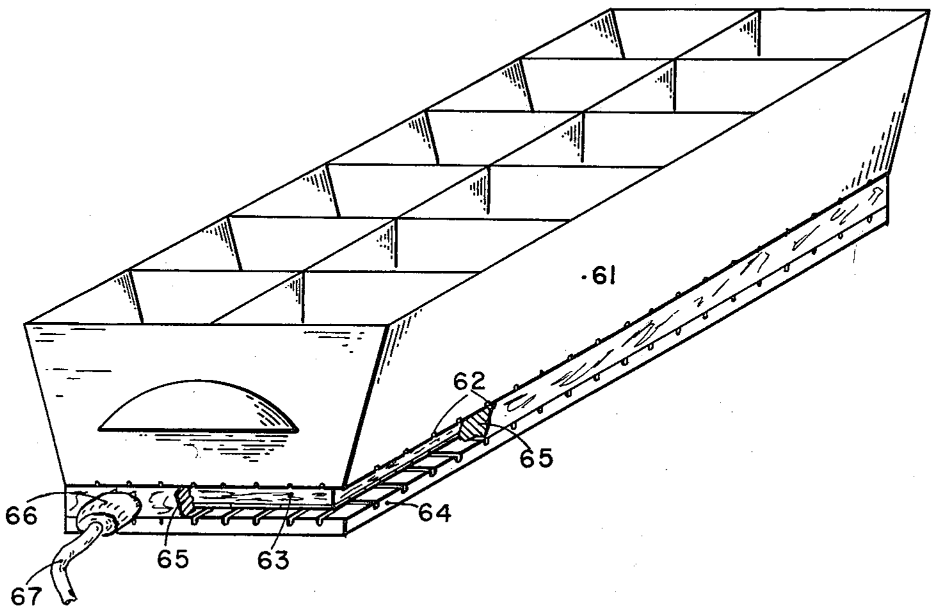

FIGURE 4 shows thermoelectric plate units bonded to a radiator on the hot junction side and to a condenser unit on the cold junction side according to the present invention;

FIGURE 5 shows a thermoelectric heat pump assembly with two stages in tandem illustrating another embodiment of the present invention; and FIGURE 6 shows an ice tray with built-in thermoelectric modules illustrating still another embodiment of the present invention.

Figure 1:
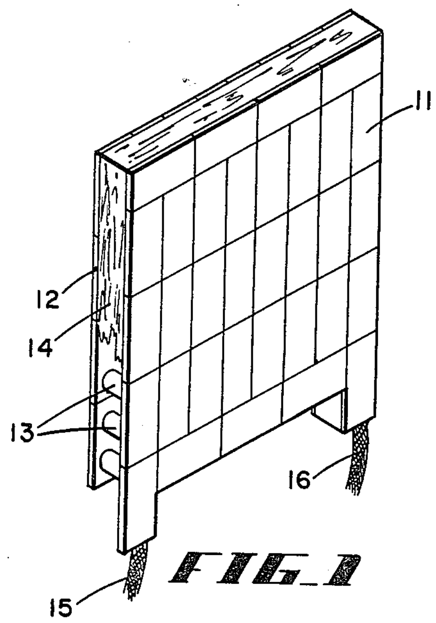
FIGURE 1 shows an isometric view of a conventional thermoelectric couple assembly or module seen from the hot junction side.

FIGURE 1 shows a thermoelectric module with the typical pattern of hot junction plates 11 usually made from copper united to the cold junction plates 12 by the legs 13 of thermocouples made from semiconductive materials. The space between the junctions not occupied by the legs of the couples is filled with a foam insulation 14, usually of polyurethane or silicon base. The couples are electrically connected in series with leads 15 and 16 to the first and last hot junctions as illustrated in the figure.

A thermoelectric module of this type is mechanically fragile as it is kept together mainly by the soldered joints between the plates and the legs. The soldering is sensitive for overheating and can usually stand temperatures only up to 150° C. or slightly above. Warping often occurs when this temperature is approached or exceeded and melted joints naturally totally destroy the module.

Modules are usually glued or cemented to plane metal surfaces, usually aluminum, which has to be anodized or covered by a non-conductive lacquer or film in order to prevent electric contacts. The surfaces of the module have to be made plane parallel and smooth for maximum heat contact.

A usual cement is a hardening epoxy compound. However, such a compound makes it almost impossible to remove the module once it is cemented. Thermoplastic gluing lacquers, easily soluble in ordinary solvents, are preferable but such lacquers are often moisture sensitive and lose their bond to metal surfaces after absorption of water. They are also difficult to apply in thin layers without developing metal contacts or shorts between the junction plates and the adjacent metal surface. The thinness of the film between the module and the metal surface to which it is attached is of paramount importance to the economy of thermoelectric cooling because of the temperature drops in the low thermal conductive film.

Another extremely difficult problem when using gluing by soluble lacquer films in connection with thermoelectric modules is the slow evaporation of the solvent between the module and the metal surface and the drying of the edges before the lacquer dries in the middle of the contact surface. The solvent gases trapped in the middle forces the undried lacquer to the sides with the result that voids or gas bubbles are formed over large areas between the module junction plates and the associated metal surface. Such voids cause large temperature drops and can often, on the hot junction side, lead to overheating and destruction of the module even if the gluing bond is seemingly perfect.

Figure 2:
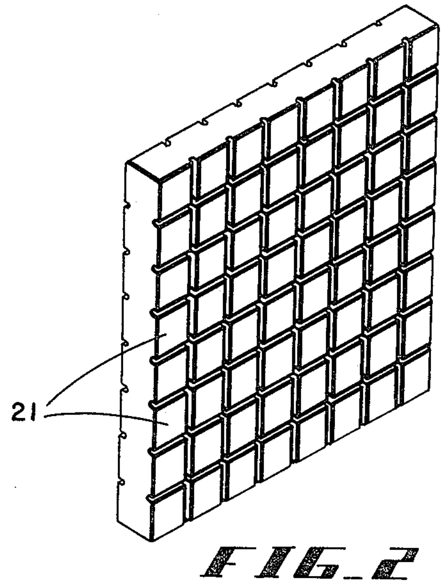
FIGURE 2 shows a protective heat equalization plate according to the invention to be glued to one or both sides of a module.

FIGURE 2 illustrates a protective and heat equalizing aluminum plate to be glued to one or both sides of a module according to the invention. The plane parallel plate, which preferably is slightly larger than the module has approximately the same thickness as the module and is, according to the invention, grooved on both sides in a pattern which leaves plane contacting surfaces 21 or contact surfaces of other form which are of approximately the same size or smaller than the surface of the individual junction plates 11 of the module, a suitable distance between the grooves being $\frac{1}{4}$ to $\frac{1}{2}$ inch for a module in which the junction plates are $\frac{1}{4}$ to $\frac{1}{2}$ inch wide and $\frac{1}{2}$ to one inch long. In general, each junction plate is in thermal contact with at least one contact surface. The grooves which have a depth of $\frac{1}{16}$–$\frac{1}{64}$ inch and approximately the same width provide escape tunnels for evaporating solvent gases so that each small contact surface 21 will get a solid film contact after drying. The drying often takes weeks before it is completely finished. Voids because of gas bubbles can never extend over more than a fraction of the small squares or contact surface 21, and as every hot junction is in contact with at least two such squares or surfaces, local overheating of hot junctions is eliminated.

FIGURE 3 illustrates schematically the method of firmly attaching the protective aluminum plates to a thermoelectric module according to the present invention. In the figure is shown a module 25 with junction plates 26 and 27 on each side. According to the invention the module 25 is by means of the lacquer films 28 and 29 glued to the grooved protective aluminum plates 30 and 31, which at least on the sides facing the module are provided with an electric insulating film 32 and 33 respectively. This electric insulation can according to the invention preferably be applied to the plates 30 and 31 by an anodizing process. The protective aluminum plates are easy to anodize and eliminate the necessity of anodizing or treating larger metal members to which the modules are attached, as will be presently described.

A suitable gluing lacquer is according to the invention, a vinyl chloride-acetate resin containing 1% maleic acid interpolymerized. A solvent for this resin (VMCH) in powdered form is isopropyl acetate. The lacquer film after gluing has a "bite" on metals like aluminum and will protect the adjacent surfaces from any moisture absorption or deterioration when the module is used at low temperatures where condensation on cold surfaces is unavoidable.

FIGURE 3*a* shows the thermoelectric plate unit resulting from the described gluing process. This plate unit is mechanically strong and free from warping. It can be clamped, glued or cemented to various heat pump components, such as, condensers and radiators without risk for destroying the electric insulation of the thermocouple junctions. It minimizes the risk of local overheating of hot junctions and the plate unit can be made completely water tight and moisture proof by sealing the edges of the module between the protective plates with a sealing compound 34.

In FIGURE 4 is shown in isometric view an embodiment of a thermoelectric heat pump assembly in which the invention is applied and which serves to illustrate the usefulness of the present invention. In FIGURE 4 is shown thermocouple modules 36 bonded to the protective heat equalizing plates 37 in a manner described above to form a heat pump plate unit. The protective anodized aluminum plates 37 are grooved on both sides according to the invention. In the figure the hot junction side of the plate unit is bonded or cemented to the plane surface of a radiator 38 provided with fins 39 and preferably cooled by the airstream from a fan (not shown in the figure). The cold junction side of the plate unit is in a similar way glued or bonded to a condenser 41 which forms part of a hermetic heat transfer system. Thermoelectric heat transfer systems including hermetic sealed heat transfer systems are described in my copending applications, Serial No. 47,161, filed August 3, 1960 and Serial No. 77,390, filed December 21, 1960. The pipe connector 42 illustrates how the condenser 41 is connected to the rest of the heat transfer system, which may serve to deliver the cooling effect of the module 36 to a refrigerator or other cooling device.

The described heat pump assembly, except the fins of the radiator 38, is embedded in an insulation 43, preferably of the rigid foam type. One of the main sources of losses in a thermoelectric heat pump system is losses between hot junction heat dissipating members such as the radiator 38 and cold junction heat absorbing members like the condenser 41. It is, therefore, of utmost importance to limit the surfaces of such members exposed to each other on the side of the modules and also to increase the distance between such members as much as possible. The thickness of modules must, for economical reasons, be made as small as possible. The described protective heat equalizing plates 37 on both sides of the module, therefore, also have the function to increase the distance between the hot and cold members of a heat pump assembly. If, for instance, the protective plates 37 each have the same thickness as the module 36 itself, the distance will be three times as large as without the plates 37 and the internal side losses will be reduced to approximately one-third of the losses when no protective plates are used. The temperature drops occurring in the aluminum plates 37 on both sides of the module are insignificant from an efficiency viewpoint compared with the reduced heat losses gained by the use of the plates 37 and the improved thermal contacts gained by grooving said plates. Experiments have confirmed the importance of both these features of the invention.

FIGURE 5 illustrates how the principle of the invention is applied to a tandem heat pump assembly in two stages, see said copending applications. The first stage thermocouple assemblies 51 are on their cold junction side glued to an aluminum condenser 52 which constitutes the heat dissipating part of a hermetic heat transfer system connected to the coupling 53. The condenser 52 is on the side facing the thermoelectric module grooved and anodized as previously described. The modules 51 are on their hot junction side in the same way glued to a solid intermediate heat transfer plate 54 preferably of aluminum and according to the invention provided with a raised portion 55 corresponding to the size of the modules 51. The surface of this raised portion to which the modules 51 are bonded is anodized and provided with grooves 56. The intermediate heat transfer plate 54 is on the other side treated in the same way and bonded to the cold junction side of the second stage modules 56 which occupy a larger surface than the first stage modules 51. The second stage modules 56 are on their hot junction side bonded to the grooved and anodized surface of another hollow vessel 57 as illustrated by the drawing. The vessel 57 can be the boiler portion of a hermetic heat transfer system connected to it by the coupling 58. The described heat pump which is assumed to operate in a known manner as a two stage tandem system, will have a considerable temperature difference between the condenser vessel 52 and the boiler vessel 57. The raised portion 55 of the intermediate heat transfer plate 54 will increase the distance between these two parts of extreme temperatures so that more insulation and reduced internal losses can be obtained. The grooving and anodizing of the solid intermediate plate 54 and the sides of the vessels 52 and 57 serves to ensure a perfect mechanical bond with maximum heat transfer and minimum temperature drop as previously described.

FIGURE 6 shows a practical application of the present invention. An ice tray 61, preferably made from aluminum, has its bottom surface anodized and provided with grooves 62. To this surface is glued, according to the invention, the cold junction side of modules 63 of approximately the same size as the bottom surface of the ice tray. To the hot junction side of the modules 63 is glued, in a similar manner, the grooved side of the anodized protective aluminum plate 64, which can be smooth on the other side. The space at the edges of the modules 63 between the ice tray 61 and the protective plate 64 is, according to the invention, filled with a water-proof compound 65 as illustrated in the drawing. The modules can be in series and supplied with direct current through the electric inlet 66 from the lead 67.

A thermoelectric ice tray with built-in thermoelectric modules, according to the invention, can be placed on any suitable heat sink for the freezing of ice cubes. It is especially useful in a thermoelectric refrigerator where direct current power supply is available, for ice freezing on ordinary shelves or for ultrarapid ice freezing on the bottom part of a freezer compartment in such a refrigerator which for this purpose should be provided with D.C. outlets on the inside walls. The assembly method described in connection with the above ice tray design can, according to the invention, be used for a multitude of other appliances where the content of a container or vessel is cooled by thermoelectric modules in direct contact with the bottom of said container or vessel.

We claim:

1. A thermoelectric heat pump assembly comprising a thermocouple assembly including hot and cold junction plates each disposed substantially on a respective plane, anodized aluminum having a grooved surface adapted to be placed in thermal contact with selected junction plates, said grooves serving to form a plurality of small individual contact surfaces on said aluminum, and bonding material serving to bond the junction plates to the cooperaitng contact surfaces.

2. A thermoelectric heat pump assembly as in claim 1 wherein each raised contact surface has an area not greater than the surface area of each cooperating junction plate.

3. A thermoelectric heat pump assembly comprising a thermocouple assembly including a plurality of hot junction plates, a plurality of cold junction plates, and legs of semiconductive material each in electrical contact at opposite ends with a selected one of the hot junction and cold junction plates, said hot junction plates having an outer surface which lies substantially in a common plane, said cold junction plates having an outer surface which lies substantially in a second common plane, at least one metal plate formed of a high thermal conductivity material placed in thermal conductive contact and in electrical insulated relationship with one of said outer surfaces, said metal plate including a plurality of spaced grooves forming a plurality of raised contacting surfaces, each of said thermal contacting surfaces having an area not greater than the surface area of the cooperating junction plates.

4. A thermoelectric heat pump assembly as in claim 3 wherein the high conductivity material comprises an aluminum plate.

5. A thermoelectric heat pump assembly as in claim 3 wherein the metal plate formed of high thermal conductivity material comprises an anodized aluminum plate.

6. A thermoelectric heat pump assembly as in claim 3 wherein the junction plates are bonded to the metal plate by a moisture insensitive bonding material.

7. A thermoelectric heat pump assembly as in claim 3 wherein the junction plates are bonded to the metal plate by a moisture insensitive lacquer film containing an evaporating solvent.

8. A thermoelectric heat pump assembly as in claim 6 wherein the metal plate is in thermal conductive contact with the outer surface of said cold junction plate and forms the bottom of an ice tray for freezing of ice cubes.

9. A thermoelectric heat pump assembly comprising a thermocouple assembly including a plurality of hot junction plates, a plurality of cold junction plates, and legs of semiconductive material in electrical contact at their opposite ends with selected ones of the hot and cold junction plates, said hot junction plates having an outer surface which lies in substantially a common plane, said cold junction plates having an outer surface which lies in a common plane, said cold junction plates having an outer surface which lies in substantially a common plane, an anodized aluminum plate in thermal conductive contact with the outer surface of the junction plates and in electrical insulated relationship therewith, a moisture sensitive bonding material serving to bond the associated junction plates to the metal plate, said metal plate including grooves spaced from one another to form a plurality of raised contact surfaces which are placed in thermal contact and bonded to the thermocouple plate, each of said surfaces having an area which is not greater than the surface area of each of said junction plates.

10. A thermoelectric heat pump assembly as in claim 9 wherein said bonding material is a thin film of vinyl chloride acetate resin containing maleic acid.

References Cited in the file of this patent

UNITED STATES PATENTS

| | | |
|---|---|---|
| 2,749,716 | Lindenblad | July 12, 1956 |
| 2,844,638 | Lindenblad | July 22, 1958 |
| 2,978,875 | Lackey | Apr. 11, 1961 |
| 2,980,746 | Claydon | Apr. 18, 1961 |